(12) United States Patent
Araki et al.

(10) Patent No.: US 11,591,480 B2
(45) Date of Patent: Feb. 28, 2023

(54) METHOD FOR MANUFACTURING SOLID ELECTROLYTIC CAPACITOR

(71) Applicant: SHOWA DENKO K.K., Tokyo (JP)

(72) Inventors: Motoaki Araki, Tokyo (JP); Takashi Okubo, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 165 days.

(21) Appl. No.: 16/635,722

(22) PCT Filed: May 9, 2018

(86) PCT No.: PCT/JP2018/017998
§ 371 (c)(1),
(2) Date: Jan. 31, 2020

(87) PCT Pub. No.: WO2019/044044
PCT Pub. Date: Mar. 7, 2019

(65) Prior Publication Data
US 2021/0130628 A1 May 6, 2021

(30) Foreign Application Priority Data
Aug. 31, 2017 (JP) .............................. JP2017-167324

(51) Int. Cl.
| | | |
|---|---|---|
| C09D 5/24 | (2006.01) | |
| C09D 7/65 | (2018.01) | |
| C09D 7/63 | (2018.01) | |
| C09D 125/18 | (2006.01) | |
| H01G 9/00 | (2006.01) | |
| H01G 9/025 | (2006.01) | |

(52) U.S. Cl.
CPC ................. *C09D 5/24* (2013.01); *C09D 7/63* (2018.01); *C09D 7/65* (2018.01); *C09D 125/18* (2013.01); *H01G 9/0036* (2013.01); *H01G 9/025* (2013.01)

(58) Field of Classification Search
CPC .......... C09D 125/18; C09D 5/24; C09D 7/63; C09D 7/65; H01G 9/0036; H01G 9/025; H01G 9/028; H01G 9/15
See application file for complete search history.

(56) References Cited

U.S. PATENT DOCUMENTS

| | | | | |
|---|---|---|---|---|
| 5,266,617 A * | 11/1993 | Han | ........................ | H01B 1/128 |
| | | | | 524/392 |
| 5,526,224 A | 6/1996 | Kanbara et al. | | |
| 6,517,892 B1 | 2/2003 | Sakai et al. | | |
| 8,721,928 B2 | 5/2014 | Jonas et al. | | |
| 9,640,325 B2 | 5/2017 | Tagawa et al. | | |
| 2007/0096066 A1* | 5/2007 | Yoshida | ................. | H01G 9/028 |
| | | | | 252/511 |
| 2015/0225589 A1* | 8/2015 | Ohori | ..................... | H01B 1/124 |
| | | | | 252/500 |
| 2016/0024315 A1* | 1/2016 | Tagawa | ................... | C08L 65/00 |
| | | | | 252/500 |
| 2016/0055981 A1* | 2/2016 | Tagawa | .................. | H01G 9/028 |
| | | | | 361/527 |
| 2016/0225531 A1 | 8/2016 | Sugihara et al. | | |
| 2017/0236647 A1 | 8/2017 | Intelmann et al. | | |
| 2017/0256362 A1 | 9/2017 | Tsubaki | | |
| 2017/0271085 A1 | 9/2017 | Tsubaki et al. | | |

FOREIGN PATENT DOCUMENTS

| | | |
|---|---|---|
| CN | 1122045 A | 5/1996 |
| CN | 101302339 A | 11/2008 |
| CN | 103390502 A | 11/2013 |
| CN | 105143302 A | 12/2015 |
| CN | 105531298 A | 4/2016 |
| CN | 106415759 A | 2/2017 |
| JP | 60-149628 A | 8/1985 |
| JP | 2003-100561 A | 4/2003 |
| JP | 2005-109252 A | 4/2005 |
| JP | 2009-182275 A | 8/2009 |
| JP | 2011-510141 A | 3/2011 |
| JP | 2014-007264 A | 1/2014 |
| JP | 2014-024905 A | 2/2014 |
| WO | 2014/136796 A1 | 9/2014 |
| WO | 2014/163202 A1 | 10/2014 |
| WO | 2016/088300 A1 | 6/2016 |
| WO | 2016/103616 A1 | 6/2016 |

OTHER PUBLICATIONS

Extended European Search Report dated May 11, 2021 from the European Patent Office in EP Application No. 18850243.9.
International Search Report for PCT/JP2018/017998 dated Aug. 14, 2018 [PCT/ISA/210].
Communication dated Jan. 29, 2022 from the State Intellectual Property Office of P.R. of China in Application No. 201880056310. 1.

* cited by examiner

*Primary Examiner* — Mark Kopec
*Assistant Examiner* — Jaison P Thomas
(74) *Attorney, Agent, or Firm* — Sughrue Mion, PLLC

(57) ABSTRACT

A method of manufacturing a solid electrolytic capacitor, including: a step (A) of providing a conjugated conductive polymer-containing dispersion by polymerizing, in a dispersion medium containing seed particles turned into protective colloid by a polyanion or in a dispersion medium containing the polyanion, a monomer for obtaining a conjugated conductive polymer; a step (B) of preparing a dispersion containing a morpholine compound and the conjugated conductive polymer by adding the morpholine compound to the conjugated conductive polymer-containing dispersion; a step (C) of causing the dispersion to adhere to a porous anode body formed of a valve metal having a dielectric film on a surface thereof; and a step (D) of forming a solid electrolyte layer by removing the dispersion medium from the dispersion containing the morpholine compound and the conjugated conductive polymer, the dispersion adhering to the porous anode body.

14 Claims, No Drawings

METHOD FOR MANUFACTURING SOLID ELECTROLYTIC CAPACITOR

CROSS REFERENCE TO RELATED APPLICATIONS

This application is a National Stage of International Application No. PCT/JP2018/017998 filed May 9, 2018, claiming priority based on Japanese Patent Application No. 2017-167324 filed Aug. 31, 2017.

TECHNICAL FIELD

The present invention relates to a method of manufacturing a solid electrolytic capacitor and a solid electrolytic capacitor obtained by the manufacturing method.

BACKGROUND ART

A solid electrolytic capacitor is manufactured by forming a dielectric oxide film on the surface of a metal through anodization and bringing a solid electrolyte into contact with the resultant. A solid electrolytic capacitor using a conductive polymer as the solid electrolyte has been proposed.

Known examples of the metal to be coated with the dielectric oxide film through the anodization include aluminum, tantalum, and niobium.

In addition, conjugated conductive polymers, such as polythiophene, polypyrrole, polyaniline, polyacetylene, polyphenylene, poly(p-phenylene-vinylene), polyacene, polythiophene vinylene, and derivatives thereof, have each been known as the conductive polymer to be used in the solid electrolytic capacitor. In addition, a technology involving using a polyanion such as a polystyrene sulfonic acid as a counter anion of the conjugated conductive polymer to dope the conjugated conductive polymer with the polyanion has been known.

The solid electrolyte is generally formed on a dielectric oxide film formed on the surface of a metal having a valve action by subjecting a monomer solution for obtaining a conductive polymer and an oxidant solution to chemical oxidative polymerization or electrolytic polymerization. In addition, a method including applying an aqueous solution or suspension of a conductive polymer to form a solid electrolyte has been proposed.

In, for example, JP 2003-100561 A (Patent Literature 1), there is a disclosure of a manufacturing method including the steps of: impregnating a capacitor element with a conductive polymer-dispersed aqueous solution having dispersed therein fine particles of a conductive polymer to form a first solid electrolyte layer; and impregnating the surface of the first solid electrolyte layer with a solution containing a heterocyclic monomer and a solution containing an oxidant individually, or impregnating the surface with a mixed solution containing the heterocyclic monomer and the oxidant, to form a second solid electrolyte layer.

In JP 2005-109252 A (Patent Literature 2), there is a disclosure of a method including: chemically polymerizing a polymerizable monomer to form a solid electrolyte layer formed of a conductive polymer on a capacitor element in which a dielectric oxide film is formed on the surface of a sintered body obtained by sintering valve metal powder; and then immersing the capacitor element in a conductive polymer solution, or applying the conductive polymer solution to the element, followed by drying, to further form a conductive polymer layer in a thick manner on the conductive polymer layer formed through the chemical polymerization.

In JP 2011-510141 A (U.S. Pat. No. 8,721,928 B2) (Patent Literature 3), there is a proposal of the following process. To impregnate a conductive polymer into a capacitor, a poly(3,4-ethylenedioxythiophene)-polystyrene sulfonic acid (PEDOT-PSS) dispersion is reduced in viscosity, and the PEDOT-PSS is polymerized by using ultrasonic irradiation.

In WO 2014/163202 A1 (U.S. Pat. No. 9,640,325 B2) (Patent Literature 4), there are disclosures of: a method in which a solid electrolytic capacitor excellent in capacitor characteristics can be manufactured with high productivity through a step of polymerizing, in a dispersion medium containing a monomer for obtaining a conjugated conductive polymer and seed particles turned into protective colloid by a polyanion, the monomer to provide a conjugated conductive polymer-containing dispersion; and a solid electrolytic capacitor. The solid electrolytic capacitor uses the conductive polymer, and hence has the following features. The capacitor has a low equivalent series resistance (ESR) and an excellent frequency characteristic, and changes in characteristics of the capacitor by a temperature change are small. In recent years, a solid electrolytic capacitor has been expected to be applied to a site where a temperature around a circuit tends to increase, such as an inverter power supply or an on-board unit, and hence improvements in high-temperature stability and high-temperature reliability of the solid electrolytic capacitor have been problems.

CITATION LIST

Patent Literature

[PTL 1] JP 2003-100561 A
[PTL 2] JP 2005-109252 A
[PTL 3] JP 2011-510141 A (U.S. Pat. No. 8,721,928 B2)
[PTL 4] WO 2014/163202 A1 (U.S. Pat. No. 9,640,325 B2)

SUMMARY OF INVENTION

Technical Problem

An object of the present invention is to provide a solid electrolytic capacitor that has a high capacity appearance ratio (capacitance), that is excellent in heat resistance, and that has high reliability under a high-temperature condition.

Solution to Problem

The inventors of the present invention have made extensive investigations, and as a result, have found that the above-mentioned problems can be solved by forming a solid electrolyte layer through a step of causing a dispersion prepared by adding a morpholine compound to a conjugated conductive polymer-containing dispersion to be used as a solid electrolyte for a solid electrolytic capacitor, that is, a dispersion containing the morpholine compound and the conjugated conductive polymer to adhere to a porous anode body formed of a valve metal having a dielectric film. Thus, the inventors have completed the present invention.

That is, the present invention relates to a method of manufacturing a solid electrolytic capacitor and a solid electrolytic capacitor described in the following items [1] to [14].

[1] A method of manufacturing a solid electrolytic capacitor, including:
  a step (A) of providing a conjugated conductive polymer-containing dispersion by polymerizing, in a dispersion medium containing seed particles turned into protective colloid by a polyanion or in a dispersion medium containing the polyanion, a monomer for obtaining a conjugated conductive polymer;

a step (B) of preparing a dispersion containing a morpholine compound represented by the following formula (1) and the conjugated conductive polymer by adding the morpholine compound to the conjugated conductive polymer-containing dispersion:

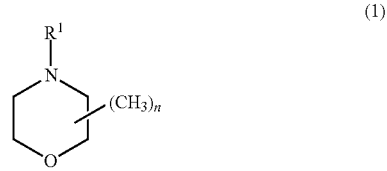

where $R^1$ represents (1) a hydrogen atom, (2) an alkyl group having 1 to 8 carbon atoms that may be substituted with a hydroxy group, a cyano group, or an amino group, (3) a cycloalkenyl group having 5 or 6 carbon atoms, (4) a phenyl group that may be substituted with an amino group, a cyano group, or a formyl group, (5) an acetyl group, (6) an acetoacetyl group, (7) an allyl group, (8) an acryloyl group, (9) a pyridyl group, (10) an alkylsulfo group that may be substituted with a hydroxy group, or (11) a formyl group, and "n" represents 0, 1, or 2;

a step (C) of causing the dispersion to adhere to a porous anode body formed of a valve metal having a dielectric film on a surface thereof; and a step (D) of forming a solid electrolyte layer by removing the dispersion medium from the dispersion containing the morpholine compound and the conjugated conductive polymer, the dispersion adhering to the porous anode body.

[2] The method of manufacturing a solid electrolytic capacitor according to the above-mentioned item [1], wherein the morpholine compound represented by the formula (1) is morpholine, 4-ethylmorpholxne, 4-n-butylmorpholine, 4-isobutylmorpholine, 4-phenylmorpholine, 4-(2-hydroxypropyl)morpholine, 4-(2-hydroxyethyl)morpholine, or 4-(3-hydroxypropyl)morpholine.

[3] The method of manufacturing a solid electrolytic capacitor according to the above-mentioned item [1] or [2], wherein the seed particles are particles of a polymer of an ethylenically unsaturated monomer.

[4] The method of manufacturing a solid electrolytic capacitor according to any one of the above-mentioned items [1] to [3], wherein the seed particles turned into the protective colloid by the polyanion have a d50 particle diameter of from 0.01 μm to 10 μm.

[5] The method of manufacturing a solid electrolytic capacitor according to any one of the above-mentioned items [1] to [4], wherein the step (A) of providing the conjugated conductive polymer-containing dispersion includes further adding a polyanion or a dispersion of seed particles turned into a protective colloid by a polyanion during the polymerization of the monomer for obtaining the conjugated conductive polymer.

[6] The method of manufacturing a solid electrolytic capacitor according to any one of the above-mentioned items [1] to [5], wherein the step (A) of providing the conjugated conductive polymer-containing dispersion includes subjecting the conjugated conductive polymer to be produced to a dispersion treatment.

[7] The method of manufacturing a solid electrolytic capacitor according to the above-mentioned item [6], wherein the dispersion treatment is ultrasonic irradiation.

[8] The method of manufacturing a solid electrolytic capacitor according to any one of the above-mentioned items [1] to [7], wherein the monomer for obtaining the conjugated conductive polymer includes at least one selected from a pyrrole compound, an aniline compound, and a thiophene compound each of which may have a substituent.

[9] The method of manufacturing a solid electrolytic capacitor according to any one of the above-mentioned items [1] to [8], wherein the monomer for obtaining the conjugated conductive polymer is a compound represented by the following formula (2):

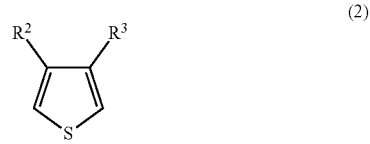

where $R^2$ and $R^3$ each independently represent a hydrogen atom, a hydroxy group, an alkyl group having 1 to 18 carbon atoms that may have a substituent, an alkoxy group having 1 to 18 carbon atoms that may have a substituent, or an alkylthio group having 1 to 18 carbon atoms that may have a substituent, or $R^2$ and $R^3$ are bonded to each other to represent an alicycle having 3 to 10 carbon atoms that may have a substituent, an aromatic ring having 6 to 10 carbon atoms that may have a substituent, an oxygen atom-containing heterocycle having 2 to 10 carbon atoms that may have a substituent, a sulfur atom-containing heterocycle having 2 to 10 carbon atoms that may have a substituent, or a sulfur atom and oxygen atom-containing heterocycle having 2 to 10 carbon atoms that may have a substituent.

[10] The method of manufacturing a solid electrolytic capacitor according to any one of the above-mentioned items [1] to [9], wherein the polyanion is a polymer having a sulfo group.

[11] The method of manufacturing a solid electrolytic capacitor according to any one of the above-mentioned items [1] to [10], wherein a ratio of anion groups in the polyanion is from 0.25 mol to 30 mol with respect to 1 mol of the monomer for obtaining the conjugated conductive polymer.

[12] The method of manufacturing a solid electrolytic capacitor according to any one of the above-mentioned items [1] to [11], wherein in the step (A) of providing the conjugated conductive polymer-containing dispersion, the dispersion medium contains water, and the polymerization is performed by using at least one oxidant selected from peroxodisulfuric acid and a salt thereof.

[13] The method of manufacturing a solid electrolytic capacitor according to any one of the above-mentioned items [1] to [12], wherein the step (B) includes adding at least one selected from ethylene glycol, propylene glycol, and glycerin as an electrical conductivity improver.

[14] A solid electrolytic capacitor, which is obtained by the manufacturing method of any one of the above-mentioned items [1] to [13].

Advantageous Effects of Invention

According to the method of manufacturing a solid electrolytic capacitor of the present invention including the step of causing the dispersion prepared by adding the morpholine compound to the conjugated conductive polymer-containing dispersion to adhere to the porous anode body formed of the valve metal having the dielectric film to form the solid electrolyte layer, the solid electrolytic capacitor that has a high capacity appearance ratio (capacitance), that is excellent in heat resistance, and that has high reliability under a high-temperature condition can be manufactured.

DESCRIPTION OF EMBODIMENTS

A method of manufacturing a solid electrolytic capacitor of the present invention is characterized by including: a step (A) of providing a conjugated conductive polymer-containing dispersion by polymerizing, in a dispersion medium containing seed particles turned into protective colloid by a polyanion or in a dispersion medium containing the polyanion, a monomer for obtaining a conjugated conductive polymer; a step (B) of preparing a dispersion containing a morpholine compound represented by the formula (1) (details thereof are described later) and the conjugated conductive polymer by adding the morpholine compound to the conjugated conductive polymer-containing dispersion; a step (C) of causing the dispersion to adhere to a porous anode body formed of a valve metal having a dielectric film on a surface thereof; and a step (D) of forming a solid electrolyte layer by removing the dispersion medium from the dispersion containing the morpholine compound and the conjugated conductive polymer, the dispersion adhering to the porous anode body.

In this description, the conjugated conductive polymer obtained by polymerizing the monomer for obtaining the conjugated conductive polymer alone, and a conjugated conductive copolymer obtained by copolymerizing a plurality of such monomers are collectively referred to as "conjugated conductive polymer".

In addition, particles in a state in which the polyanion coordinates to the surface of each of the seed particles to form the protective colloid are referred to as "seed particles turned into protective colloid by a polyanion". The polyanion means a polymer having two or more anionic groups.

<Step (A) of Providing Conjugated Conductive Polymer-Containing Dispersion>

The step (A) of providing the conjugated conductive polymer-containing dispersion is performed by polymerizing, in (1) the dispersion medium containing the monomer for obtaining the conjugated conductive polymer and the seed particles turned into the protective colloid by the polyanion, or in (2) the dispersion medium containing the monomer for obtaining the conjugated conductive polymer and the polyanion, the monomer.

The conjugated conductive polymer-containing dispersion (hereinafter sometimes referred to as "dispersion "a"") obtained by the step (A) is a dispersion in which at least one selected from a composite of the conjugated conductive polymer and the seed particles turned into the protective colloid by the polyanion, and a composite of the conjugated conductive polymer and the polyanion is dispersed in a dispersion medium. In this step, the polyanion may be doped into the conjugated conductive polymer to form a composite.

[Conjugated Conductive Polymer]

In this description, the conjugated conductive polymer is not particularly limited as long as the polymer is an organic polymer compound having a n-conjugated system in its main chain. Examples of the conjugated conductive polymer compound include polypyrroles, polythiophenes, polyisothianaphthenes, polyacetylenes, polyphenylenes, polyphenylene vinylenes, polyanilines, polyacenes, polythiophene vinylenes, and copolymers thereof. The letter "s" in the representation of the conjugated conductive polymer compound means a group of compounds each including the structure of the compound in front of the letter; for example, the polypyrroles refer to a group of compounds each including a polypyrrole structure.

Of the conjugated conductive polymers, polypyrroles, polythiophenes, and polyanilines are preferred, and polythiophenes are more preferred. In addition, a conjugated conductive polymer having a substituent, such as an alkyl group, a carboxy group, a sulfo group, an alkoxy group, a hydroxy group, or a cyano group, is preferred from the viewpoint of obtaining high conductivity.

Specific examples of the polypyrroles, the polythiophenes, and the polyanilines serving as preferred conjugated conductive polymers are shown below.

Examples of the polypyrroles include polypyrrole, poly (N-methylpyrrole), poly(3-methylpyrrole), poly(3-ethylpyrrole), poly(3-n-propylpyrrole), poly(3-butylpyrrole), poly (3-octylpyrrole), poly(3-decylpyrrole), poly(3-dodecylpyrrole), poly(3,4-dimethylpyrrole), poly(3,4-dibutylpyrrole), poly(3-carboxypyrrole), poly(3-methyl-4-carboxypyrrole), poly(3-methyl-4-carboxyethylpyrrole), poly(3-methyl-4-carboxybutylpyrrole), poly(3-hydroxypyrrole), poly(3-methoxypyrrole), poly(3-ethoxypyrrole), poly (3-butoxypyrrole), poly(3-hexyloxypyrrole), poly(3-methyl-4-hexyloxypyrrole), and poly(3-methyl-4-hexyloxypyrrole).

Examples of the polythiophenes include polythiophene, poly(3-methylthiophene), poly(3-hexylthiophene), poly(3-heptylthiophene), poly(3-octylthiophene), poly(3-decylthiophene), poly(3-dodecylthiophene), poly(3-octadecylthiophene), poly(3-bromothiophene), poly(3-chlorothiophene), poly(3-iodothiophene), poly(3-cyanothiophene), poly(3-phenylthiophene), poly(3,4-dimethylthiophene), poly(3,4-dibutylthiophene), poly(3-hydroxythiophene), poly(3-methoxythiophene), poly(3-ethoxythiophene), poly(3-butoxythiophene), poly(3-hexyloxythiophene), poly(3-heptyloxythiophene), poly(3-octyloxythiophene), poly(3-decyloxythiophene), poly(3-dodecyloxythiophene), poly(3-octadecyloxythiophene), poly(3,4-dihydroxythiophene), poly(3,4-dimethoxythiophene), poly(3,4-diethoxythiophene), poly(3,4-dipropoxythiophene), poly(3,4-dibutoxythiophene), poly(3,4-dihexyloxythiophene), poly(3,4-diheptyloxythiophene), poly(3,4-dioctyloxythiophene), poly(3,4-didecyloxythiophene), poly(3,4-didodecyloxythiophene), poly(3,4-ethylenedioxythiophene), poly(3,4-propylenedioxythiophene), poly(3,4-butylenedioxythiophene), poly(3-methyl-4-methoxythiophene), poly(3-methyl-4-ethoxythiophene), poly(3-carboxythiophene), poly(3-methyl-4-carboxythiophene), poly(3-methyl-4-carboxyethylthiophene), poly(3-methyl-4-carboxybutylthiophene), and poly(3,4-ethyleneoxythiathiophene).

Examples of the polyanilines include polyaniline, poly(2-methylaniline), poly(3-isobutylaniline), poly(2-anilinesulfonic acid), and poly(3-anilinesulfonic acid).

Of those, polypyrrole, polythiophene, poly(N-methylpyrrole), poly(3-methylthiophene), poly(3-methoxythiophene), and poly(3,4-ethylenedioxythiophene) are preferred from the viewpoint of high conductivity. Of those, poly(3,4-ethylenedioxythiophene) (PEDOT) is more preferred because of particularly high conductivity and excellent heat resistance.

In the present invention, the conjugated conductive polymers may be used alone or in combination thereof.

[Monomer for Obtaining Conjugated Conductive Polymer]

The monomer that turns into a constituent unit of the conjugated conductive polymer preferably contains one or more kinds selected from pyrrole that may have a substituent, aniline that may have a substituent, and thiophene that may have a substituent. Examples of the substituent include an alkyl group having 1 to 18 carbon atoms, an aryl group having 6 to 10 carbon atoms, a heteroaryl group having 5 to 10 carbon atoms, an alkoxy group having 1 to 18 carbon atoms, an alkylthio group having 1 to 18 carbon atoms, a carboxy group, a hydroxy group, a halogen atom, and a cyano group. The alkyl group, the aryl group, the heteroaryl group, the alkoxy group, and the alkylthio group may each be substituted with one or more kinds selected from a carboxy group, a hydroxy group, a halogen atom, and a cyano group. In addition, two or more of the substituents may be fused to each other to form a ring.

Specific examples of the monomer include:

pyrrole, N-methylpyrrole, 3-methylpyrrole, 3-ethylpyrrole, 3-n-propylpyrrole, 3-butylpyrrole, 3-octylpyrrole, 3-decylpyrrole, 3-dodecylpyrrole, 3,4-dimethylpyrrole, 3,4-dibutylpyrrole, 3-carboxypyrrole, 3-methyl-4-carboxypyrrole, 3-methyl-4-carboxyethylpyrrole, 3-methyl-4-carboxybutylpyrrole, 3-hydroxypyrrole, 3-methoxypyrrole, 3-ethoxypyrrole, 3-butoxypyrrole, 3-hexyloxypyrrole, 3-methyl-4-hexyloxypyrrole, and 3-methyl-4-hexyloxypyrrole;

thiophene, 3-methylthiophene, 3-ethylthiophene, 3-propylthiophene, 3-butylthiophene, 3-hexylthiophene, 3-heptylthiophene, 3-octylthiophene, 3-decylthiophene, 3-dodecylthiophene, 3-octadecylthiophene, 3-bromothiophene, 3-chlorothiophene, 3-iodothiophene, 3-cyanothiophene, 3-phenylthiophene, 3,4-dimethylthiophene, 3,4-dibutylthiophene, 3-hydroxythiophene, 3-methoxythiophene, 3-ethoxythiophene, 3-butoxythiophene, 3-hexyloxythiophene, 3-heptyloxythiophene, 3-octyloxythiophene, 3-decyloxythiophene, 3-dodecyloxythiophene, 3-octadecyloxythiophene, 3,4-dihydroxythiophene, 3,4-dimethoxythiophene, 3,4-diethoxythiophene, 3,4-dipropoxythiophene, 3,4-dibutoxythiophene, 3,4-dihexyloxythiophene, 3,4-diheptyloxythiophene, 3,4-dioctyloxythiophene, 3,4-didecyloxythiophene, 3,4-didodecyloxythiophene, 3,4-ethylenedioxythiophene, 3,4-propylenedioxythiophene, 3,4-butylenedioxythiophene, 3-methyl-4-methoxythiophene, 3-methyl-4-ethoxythiophene, 3-carboxythiophene, 3-methyl-4-carboxythiophene, 3-methyl-4-carboxyethylthiophene, 3-methyl-4-carboxybutylthiophene, and 3,4-ethyleneoxythiathiophene; and aniline, 2-methylaniline, 3-isobutylaniline, 2-anilinesulfonic acid, and 3-anilinesulfonic acid.

In the present invention, the monomers for obtaining the conjugated conductive polymer may be used alone or in combination thereof.

Of the monomers, a compound represented by the following formula (2) is preferably incorporated as the monomer for obtaining the conjugated conductive polymer; a compound represented by the following formula (3) is more preferably incorporated, and 3,4-ethylenedioxythiophene is still more preferably incorporated.

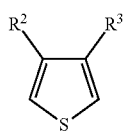

(2)

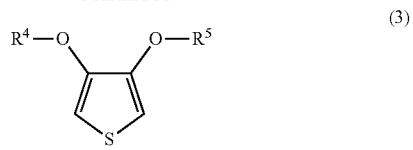

In the formula (2), $R^2$ and $R^3$ each independently represent a hydrogen atom, a hydroxy group, an alkyl group having 1 to 18 carbon atoms that may have a substituent, an alkoxy group having 1 to 18 carbon atoms that may have a substituent, or an alkylthio group having 1 to 18 carbon atoms that may have a substituent. $R^2$ and $R^3$ are bonded to each other to form a ring to represent an alicycle having 3 to 10 carbon atoms that may have a substituent, an aromatic ring having 6 to 10 carbon atoms that may have a substituent, an oxygen atom-containing heterocycle having 2 to 10 carbon atoms that may have a substituent, a sulfur atom-containing heterocycle having 2 to 10 carbon atoms that may have a substituent, or a sulfur atom and oxygen atom-containing heterocycle having 2 to 10 carbon atoms that may have a substituent. Examples of the substituent include an alkyl group having 1 to 18 carbon atoms, an aryl group having 6 to 10 carbon atoms, a heteroaryl group having 5 to 10 carbon atoms, an alkoxy group having 1 to 18 carbon atoms, an alkylthio group having 1 to 18 carbon atoms, a carboxy group, a hydroxy group, a halogen atom, and a cyano group. The alkyl group, the aryl group, the heteroaryl group, the alkoxy group, and the alkylthio group may be substituted with a carboxy group, a hydroxy group, a halogen atom, or a cyano group. In addition, two or more substituents may be fused to each other to form a ring.

Examples of the oxygen atom-containing heterocycle include an oxirane ring, an oxetane ring, a furan ring, a hydrofuran ring, a pyran ring, a pyrone ring, a dioxane ring, and a trioxane ring.

Examples of the sulfur atom-containing heterocycle include a thiirane ring, a thietane ring, a thiophene ring, a thiane ring, a thiopyran ring, a thiopyrylium ring, a benzothiopyran ring, a dithiane ring, a dithiolane ring, and a trithiane ring.

Examples of the sulfur atom and oxygen atom-containing heterocycle include an oxathiolane ring and an oxathiane ring.

In the formula (3), $R^4$ and $R^5$ each independently represent a hydrogen atom or an alkyl group having 1 to 4 carbon atoms that may have a substituent, or $R^4$ and $R^5$ represent an oxygen atom-containing heterocycle having 3 to 6 carbon atoms that may have a substituent, the heterocycle being formed by the bonding of $R^4$ and $R^5$ to each other.

$R^4$ and $R^5$ preferably represent an oxygen atom-containing heterocycle having 3 to 6 carbon atoms that may have a substituent, the heterocycle being formed by the bonding of $R^4$ and $R^5$ to each other. Examples of the oxygen atom-containing heterocycle include a dioxane ring and a trioxane ring. Of those, a dioxane ring is preferred. Examples of the substituent include an alkyl group having 1 to 18 carbon atoms, an aryl group having 6 to 10 carbon atoms, a heteroaryl group having 5 to 10 carbon atoms, an alkoxy group having 1 to 18 carbon atoms, an alkylthio group having 1 to 18 carbon atoms, a carboxy group, a hydroxy group, a halogen atom, and a cyano group. The alkyl group, the aryl group, the heteroaryl group, the alkoxy group, and the alkylthio group may each be substituted with a carboxy group, a hydroxy group, a halogen atom, or a cyano group. In addition, two or more substituents may be fused to each other to form a ring.

[Polyanion]

The polyanion is a polymer having two or more anionic groups. The polyanion coordinates to the surface of each of the seed particles to form the protective colloid, and functions as a dopant for the conjugated conductive polymer.

Examples of any such anionic group include: a group formed of a sulfonic acid or a salt thereof; a group formed of phosphoric acid or a salt thereof; a monosubstituted phosphoric acid ester group; a group formed of a carboxylic acid or a salt thereof; and a monosubstituted sulfuric acid ester group. Of those, a strongly acidic group is preferred, a group formed of a sulfonic acid or a salt thereof, and a group formed of phosphoric acid or a salt thereof are more preferred, and a group formed of a sulfonic acid or a salt thereof is still more preferred.

The anionic groups may each be directly bonded to the main chain of the polymer, or may each be bonded to a side chain thereof. When any such anionic group is bonded to a side chain thereof, the group is preferably bonded to the terminal of the side chain because a doping effect becomes more significant.

The polyanion may have a substituent except the anionic group. Examples of the substituent include an alkyl group, a hydroxy group, an alkoxy group, a phenol group, a cyano group, a phenyl group, a hydroxyphenyl group, an ester group, a halogeno group, an alkenyl group, an imide group, an amide group, an amino group, an oxycarbonyl group, and a carbonyl group. Of those, an alkyl group, a hydroxy group, a cyano group, a phenol group, and an oxycarbonyl group are preferred, and an alkyl group, a hydroxy group, and a cyano group are more preferred. The substituent may be directly bonded to the main chain of the polymer, or may be bonded to a side chain thereof. When the substituent is bonded to a side chain thereof, the substituent is preferably bonded to the terminal of the side chain in order that the substituent may exhibit its own action and effect.

An alkyl group that may be substituted into the polyanion can be expected to exhibit improving actions on, for example, the solubility and dispersibility of the polyanion in the dispersion medium, and the compatibility thereof with, and the dispersibility thereof in, the conjugated conductive polymer. Examples of the alkyl group include: chain alkyl groups, such as a methyl group, an ethyl group, a propyl group, a butyl group, an isobutyl group, a t-butyl group, a pentyl group, a hexyl group, an octyl group, a decyl group, and a dodecyl group; and cycloalkyl groups, such as a cyclopropyl group, a cyclopentyl group, and a cyclohexyl group. In consideration of, for example, the solubility in the dispersion medium, the dispersibility in the conjugated conductive polymer, and the steric hindrance of the polyanion, an alkyl group having 1 to 12 carbon atoms is more preferred.

A hydroxy group that may be substituted into the polyanion facilitates the formation of a hydrogen bond with any other hydrogen atom or the like, and can be expected to exhibit improving actions on the solubility of the polyanion in the dispersion medium, and the compatibility thereof with, the dispersibility thereof in, and the adhesive property thereof with, the conjugated conductive polymer. The hydroxy group is preferably a hydroxy group bonded to the terminal of an alkyl group having 1 to 6 carbon atoms that is bonded to the main chain of the polymer.

A cyano group and a hydroxyphenyl group that may be substituted into the polyanion can be expected to exhibit improving actions on the compatibility of the polyanion with the conjugated conductive polymer, the solubility thereof in the dispersion medium, and the heat resistance thereof. The cyano group is preferably a cyano group directly bonded to the main chain of the polymer, a cyano group bonded to the terminal of an alkyl group having 1 to 7 carbon atoms that is bonded to the main chain of the polymer, or a cyano group bonded to the terminal of an alkenyl group having 2 to 7 carbon atoms that is bonded to the main chain of the polymer.

The oxycarbonyl group that may be substituted into the polyanion is preferably an alkyloxycarbonyl group, an aryloxycarbonyl group, or an alkyloxycarbonyl group or an aryloxycarbonyl group formed by interposing any other functional group, each of which is directly bonded to the main chain of the polymer.

The composition of the main chain of the polymer of the polyanion is not particularly limited. Examples of the main chain of the polymer include a polyalkylene, a polyimide, a polyamide, and a polyester. Of those, a polyalkylene is preferred from the viewpoint of ease of synthesis and availability.

The polyalkylene is a polymer formed of repeating units of an ethylenically unsaturated monomer. The polyalkylene may have a carbon-carbon double bond in a main chain thereof. Examples of the polyalkylene include polyethylene, polypropylene, polybutene, polypentene, polyhexene, polyvinyl alcohol, polyvinyl phenol, poly(3,3,3-trifluoropropylene), polyacrylonitrile, polyacrylate, polymethacrylate, polystyrene, polybutadiene, and polyisoprene.

An example of the polyimide is a polyimide obtained by a polycondensation reaction between an acid anhydride, such as pyromellitic dianhydride, biphenyltetracarboxylic dianhydride, benzophenonetetracarboxylic dianhydride, 2,2,3,3-tetracarboxydiphenyl ether dianhydride, or 2,2-[4,4'-di(dicarboxyphenyloxy)phenyl]propane dianhydride, and a diamine, such as oxydianiline, p-phenylenediamine, m-phenylenediamine, or benzophenonediamine.

Examples of the polyamide include polyamide 6, polyamide 6,6, and polyamide 6,10.

Examples of the polyester include polyethylene terephthalate and polybutylene terephthalate.

Specific examples of the polymer having a sulfo group to be suitably used as the polyanion include polyvinylsulfonic acid, polystyrenesulfonic acid, polyallylsulfonic acid, polyethyl acrylate sulfonic acid, polybutyl acrylate sulfonic acid, poly(2-acrylamido-2-methylpropanesulfonic acid), and polyisoprenesulfonic acid. Those polymers may be homopolymers or copolymers of two or more kinds thereof. Of those, polystyrenesulfonic acid, polyisoprenesulfonic acid, polyethyl acrylate sulfonic acid, and polybutyl acrylate sulfonic acid are preferred, and polystyrenesulfonic acid (PSS) is more preferred from the viewpoint of imparting conductivity.

The polyanion, in particular, the polymer having a sulfo group improves the dispersibility of the monomer for obtaining the conjugated conductive polymer in the dispersion medium, and functions as a dopant for the conjugated conductive polymer.

The weight-average molecular weight of the polyanion to be used in the present invention is preferably from 1,000 to 1,000,000, more preferably from 5,000 to 500,000, still more preferably from 50,000 to 300,000. When the weight-average molecular weight falls within the range, the solubility of the polyanion in the dispersion medium and the doping of the polyanion into the conjugated conductive polymer become satisfactory. The term "weight-average molecular weight" as used herein refers to a value measured as a molecular weight in terms of polystyrene through the use of gel permeation chromatography.

A product having the above-mentioned characteristics may be selected from commercial products as the polyanion, or the polyanion may be synthesized by a known method. A method of synthesizing the polyanion is described in, for example, JP 2005-76016 A.

The usage amount of the polyanion used in the process of synthesizing the seed particles is such an amount that the ratio of the anionic groups in the polyanion becomes preferably from 0.25 mol to 30 mol, more preferably from 0.8 mol to 25 mol with respect to 1 mol of the monomer for obtaining the conjugated conductive polymer. The usage amount of the polyanion includes a polyanion to be loaded in advance before the initiation of the polymerization of a monomer of the seed particles.

In addition, the usage amount of the polyanion with respect to 100 parts by mass of the conjugated conductive polymer in this step is preferably from 10 parts by mass to 30,000 parts by mass, more preferably from 50 parts by mass to 25,000 parts by mass.

When the usage amount of the polyanion is 10 parts by mass or more, the conductivity of the conductive polymer is appropriate, and when the usage amount is 30,000 parts by mass or less, the dispersibility of the conductive polymer in the dispersion medium is satisfactory.

[Seed Particles]

The seed particles to be used in the present invention are polymer particles turned into protective colloid by the polyanion in the dispersion medium. The seed particles are preferably, for example, particles each formed of a polymer containing one or two or more kinds of ethylenically unsaturated monomers as constituent units. The polymer may be one kind of polymer alone, or may be a mixture of two or more kinds of polymers. In addition, the polymer may be crystalline or amorphous. When the polymer is crystalline, its degree of crystallinity is preferably 50% or less.

The ethylenically unsaturated monomer only needs to have one or more polymerizable ethylenic carbon-carbon double bonds. Examples of the ethylenically unsaturated monomer include: (meth)acrylates each having a linear, branched, or cyclic alkyl chain; aromatic vinyl compounds, such as styrene and α-methylstyrene; heterocyclic vinyl compounds, such as vinylpyrrolidone; hydroxyalkyl (meth) acrylates; dialkylaminoalkyl (meth)acrylates, such as 2-ethylhexyl (meth)acrylate; vinyl esters, such as vinyl acetate and a vinyl alkanoate; monoolefins, such as ethylene, propylene, butylene, and isobutylene; conjugated diolefins, such as butadiene, isoprene, and chloroprene; α,β-unsaturated mono- or dicarboxylic acids, such as acrylic acid, methacrylic acid, crotonic acid, itaconic acid, maleic acid, and fumaric acid;

vinyl cyanide compounds, such as acrylonitrile; and carbonyl group-containing vinyl compounds, such as acrolein and diacetone acrylamide. Those ethylenically unsaturated monomers may be used alone or in combination thereof.

In this description, the term "(meth)acryl" refers to an acryl or a methacryl, and the term "(meth)acrylate" refers to an acrylate or a methacrylate.

In addition, the ethylenically unsaturated monomer may contain a crosslinkable monomer, and the molecules of the monomer may be crosslinked, or a combination of the monomer and an ethylenically unsaturated compound having an active hydrogen group may be crosslinked. The formation of a crosslinked copolymer can improve the water resistance, moisture resistance, heat resistance, and the like of a conductive film formed of the conjugated conductive polymer. The crosslinkable monomer refers to a compound having two or more ethylenic carbon-carbon double bonds, or a compound having one or more ethylenic carbon-carbon double bonds and having one or more other reactive groups.

Examples of the crosslinkable monomer include: epoxy group-containing α,β-ethylenically unsaturated compounds, such as glycidyl (meth)acrylate; hydrolyzable alkoxysilyl group-containing α,β-ethylenically unsaturated compounds, such as vinyltriethoxysilane and γ-methacryloxypropyltrimethoxysilane; and polyfunctional vinyl compounds, such as ethylene glycol di(meth)acrylate, trimethylolpropane tri (meth)acrylate, allyl (meth)acrylate, divinylbenzene, and diallyl phthalate.

In addition, the crosslinking may be performed by using a crosslinkable monomer, such as a carbonyl group-containing α,β-ethylenically unsaturated compound (a ketone group-containing compound) in combination with a polyhydrazine compound (particularly with a compound having two or more hydrazide groups, such as oxalic acid dihydrazide, succinic acid dihydrazide, adipic acid dihydrazide, or polyacrylic acid hydrazide).

The content of the crosslinkable monomer in the ethylenically unsaturated monomer is preferably 50 mass % or less, more preferably 35 mass % or less, still more preferably 25 mass % or less.

Manufacture of Seed Particles Turned Into Protective Colloid by Polyanion:

The seed particles are turned into the protective colloid by the polyanion in the dispersion medium, and a dispersion of the seed particles turned into the protective colloid, which are dispersed in the dispersion medium, may be manufactured as a resin emulsion.

The polymerization reaction of the resin emulsion is a radical polymerization reaction, and is preferably performed with a normal-pressure reactor or a pressure-resistant reactor by any one of a batch-type method, a semi-continuous method, and a continuous method. In addition, in terms of reaction stability at the time of the polymerization and the uniformity of the polymer, the polymerization is preferably performed by continuously or intermittently adding the ethylenically unsaturated monomer to a polyanion-containing liquid obtained by dissolving, emulsifying, or dispersing the ethylenically unsaturated monomer and the polyanion in the dispersion medium in advance.

The reaction is typically performed at a temperature of from 10° C. to 100° C., and the temperature is generally from 30° C. to 90° C. A reaction time is not particularly limited, and is appropriately adjusted in accordance with, for example, the usage amounts of the respective components, the kind of a polymerization initiator, and the reaction temperature.

At the time of the radical polymerization, the polyanion that is the protective colloid contributes to the stability of the particles of the emulsion; emulsifying agents, such as an anionic emulsifying agent, a nonionic emulsifying agent, and a reactive emulsifying agent, an aliphatic amine, and the like may each be added to a polymerization system as required. The kinds and usage amounts of the emulsifying agents and the aliphatic amines are appropriately regulated in accordance with various conditions including the usage amount of the polyanion and the composition of the ethylenically unsaturated monomer.

Examples of the emulsifying agent to be used in such radical polymerization reaction include: anionic emulsifying agents, such as an alkyl sulfuric acid ester salt, an alkylbenzene sulfonic acid salt, an alkyl sulfosuccinic acid salt, an alkyl diphenyl ether disulfonic acid salt, a polyoxyalkylene alkyl sulfuric acid salt, and a polyoxyalkylene alkyl phosphoric acid ester; and nonionic surfactants, such as a polyoxyalkylene alkyl ether, a polyoxyalkylene alkyl phenol ether, a polyoxyalkylene fatty acid ester, and a polyoxyalkylene sorbitan fatty acid ester.

Examples of the aliphatic amine include: primary amines, such as octylamine, laurylamine, myristylamine, stearylamine, and oleylamine; secondary amines, such as dioctylamine, dilaurylamine, distearylamine, and dioleylamine; and tertiary amines, such as N,N-dimethyllaurylamine, N,N-dimethylmyristylamine, N,N-dimethylpalmitylamine, N,N-dimethylstearylamine, N,N-dimethylbehenylamine, N,N-dimethyloleylamine, N-methyldidecylamine, and N-methyldioleylamine.

The emulsifying agents and the aliphatic amines may be used alone or in combination thereof.

In addition, a water-soluble polymer, such as polyvinyl alcohol, methyl cellulose, carboxymethyl cellulose, hydroxyethyl cellulose, hydroxypropyl cellulose, or polyvinyl pyrrolidone, may be used in combination to the extent that the characteristics of the conjugated conductive polymer to be obtained are not impaired.

The dispersion medium is an aqueous medium, and is, for example, water or a mixed solvent of water and a water-soluble solvent. The ratio of the water-soluble solvent in the mixed solvent is preferably from 0 mass % to 30 mass %. When the ratio of the water-soluble solvent is 30 mass % or less, the polymerization reaction of the resin emulsion can be stabilized. Examples of the water-soluble solvent include: alcohols, such as methanol, ethanol, and isopropyl alcohol; ketones, such as acetone; glycols, such as ethylene glycol and propylene glycol; and ethers, such as ethylene glycol monomethyl ether and ethylene glycol monobutyl ether.

A known and commonly used polymerization initiator may be used as the polymerization initiator to be used at the time of the radical polymerization. Examples of the polymerization initiator include: inorganic peroxides, such as hydrogen peroxide, persulfuric acid, ammonium persulfate, potassium persulfate, and sodium persulfate; organic peroxides, such as benzoyl peroxide and t-butyl hydroperoxide; and azo compounds, such as 2,2'-azobisisobutyronitrile and 4,4'-azobis(4-cyanovaleric acid). In addition, any such polymerization initiator may be combined with any one of, for example, sodium sulfoxylate formaldehyde, ascorbic acids, sulfites, tartaric acid or salts thereof, and iron(II) sulfate as required to perform redox polymerization. In addition, chain transfer agents, such as alcohols and mercaptans, may each be used as required.

With regard to the usage amounts of the polyanion and the ethylenically unsaturated monomer at the time of the manufacture of the seed particles turned into the protective colloid, the usage amount of the ethylenically unsaturated monomer is preferably from 10 parts by mass to 100 parts by mass, more preferably from 20 parts by mass to 90 parts by mass with respect to 100 parts by mass of the polyanion. When the usage amount of the ethylenically unsaturated monomer is 10 parts by mass or more, the ratio of a conductive polymer containing the seed particles turned into the protective colloid by the polyanion in the conjugated conductive polymer is appropriate, and hence the thickening of the emulsion by the polymerization can be suppressed. When the usage amount is 100 parts by mass or less, the stability of the seed particles turned into the protective colloid is satisfactory.

The d50 particle diameter (50% median diameter on a volume basis) of the seed particles turned into the protective colloid and dispersed in the dispersion medium is preferably from 0.01 µm to 10 µm, more preferably from 0.05 µm to 1 µm, still more preferably from 0.1 µm to 0.8 µm. The particle diameter distribution of the seed particles may be measured with a Microtrac UPA-type particle size distribution-measuring apparatus manufactured by Nikkiso Co., Ltd. When the d50 particle diameter of the seed particles dispersed in the dispersion medium is 0.01 µm or more, the dispersibility of the seed particles is satisfactory, and when the d50 particle diameter is 10 µm or less, the particles hardly sediment.

Polymerization of Monomer for Obtaining Conjugated Conductive Polymer:

The polymerization of the monomer for obtaining the conjugated conductive polymer is performed in (1) the dispersion medium containing the monomer and the seed particles turned into the protective colloid by the polyanion, or in (2) the dispersion medium containing the monomer and the polyanion.

[Monomer Liquid for Obtaining Conjugated Conductive Polymer]

To polymerize the monomer for obtaining the conjugated conductive polymer in the dispersion medium, a dispersion containing the monomer and the seed particles turned into the protective colloid, or a dispersion containing the monomer and the polyanion (hereinafter sometimes collectively simply referred to as "monomer liquid") is prepared.

The monomer liquid only needs to be a liquid in which the monomer for obtaining the conjugated conductive polymer is uniformly dispersed. A strong stirring apparatus, such as a homogenizer, or an ultrasonic irradiation apparatus is typically used in a dispersion treatment for that purpose. Of those, an ultrasonic irradiation treatment is preferred. Although ultrasonic irradiation energy is not particularly limited as long as a homogeneous monomer liquid is obtained, the treatment is preferably performed at a power consumption of from 5 W/liter (L) to 500 W/L for an irradiation time of from 0.1 hour/liter (L) to 2 hours/L.

In addition, when the dispersion containing the monomer for obtaining the conjugated conductive polymer and the seed particles turned into the protective colloid by the polyanion is used as the monomer liquid, the same polyanion as that used for turning the seed particles into the protective colloid is preferably incorporated into the liquid from the viewpoint of suppressing the aggregation of the conjugated conductive polymer to be produced by the polymerization. The polyanion may be incorporated by adding the polyanion to the monomer liquid, followed by its dissolution, emulsification, or dispersion therein. When a polyanion except that in the dispersion of the seed particles turned into the protective colloid is incorporated into the monomer liquid, its amount is preferably from 5 mass % to 99 mass %, more preferably from 10 mass % to 90 mass %, still more preferably from 20 mass % to 80 mass % of the total amount of the polyanions to be used.

[Dispersion Medium]

Although the dispersion medium to be used for the polymerization of the monomer for obtaining the conjugated conductive polymer is not particularly limited as long as the composite of the conjugated conductive polymer and the seed particles turned into the protective colloid by the polyanion, or the composite of the conjugated conductive polymer and the polyanion can be dispersed therein, the dispersion medium is preferably of the same kind as that of the dispersion medium used in the dispersion of the seed particles.

Examples of the dispersion medium include: water; amides, such as N-vinylpyrrolidone, hexamethylphosphortriamide, N-vinylformamide, and N-vinylacetamide; phenols, such as cresol, phenol, and xylenol; polyhydric alcohols, such as dipropylene glycol, 1,3-butylene glycol, 1,4-butylene glycol, diglycerin, isoprene glycol, butanediol, 1,5-pentanediol, 1,6-hexanediol, 1,9-nonanediol, and neopentyl glycol; carbonate compounds, such as ethylene carbonate and propylene carbonate; ethers, such as dioxane, diethyl ether, a propylene glycol dialkyl ether, a polyethylene glycol dialkyl ether, and a polypropylene glycol dialkyl ether; heterocyclic compounds, such as 3-methyl-2-oxazolidinone; and nitriles, such as acetonitrile, glutarodinitrile, methoxyacetonitrile, propionitrile, and benzonitrile. These dispersion media may be used alone or in combination thereof. Of those, a dispersion medium containing 1 mass % to 99 mass % of water is preferably used, a dispersion medium containing 50 mass % to 99 mass % of water is more preferably used, and water alone is still more preferably used.

The usage amount of the dispersion medium is preferably from 1 part by mass to 50,000 parts by mass, more preferably from 50 parts by mass to 10,000 parts by mass with respect to 100 parts by mass of the total of the monomer for obtaining the conjugated conductive polymer, the seed particles turned into the protective colloid by the polyanion, and the polyanion. When the usage amount of the dispersion medium is 1 part by mass or more, the viscosity of the reaction liquid during the polymerization is appropriate, and when the usage amount is 50,000 parts by mass or less, the performance of a solid electrolytic capacitor to be obtained is satisfactory.

[Oxidant]

In the polymerization of the monomer, for example, when a dispersion containing any of polypyrroles and polythiophenes as the conjugated conductive polymer is manufactured, the polymerization is initiated by setting the temperature of the dispersion medium to a predetermined temperature in the presence of an oxidant.

Examples of the oxidant include: peroxodisulfuric acid and peroxodisulfuric acid salts, such as ammonium peroxodisulfate, sodium peroxodisulfate, and potassium peroxodisulfate; metal halogen compounds, such as boron trifluoride; transition metal compounds, such as ferric chloride, ferric sulfate, and cupric chloride; metal oxides, such as silver oxide and cesium oxide; peroxides, such as hydrogen peroxide and ozone; organic peroxides, such as benzoyl peroxide; and oxygen. Of those, peroxodisulfuric acid and peroxodisulfuric acid salts are preferred, and peroxodisulfuric acid salts are more preferred.

The oxidants may be used alone or in combination thereof.

[Polymerization Temperature]

The temperature at the time of the polymerization of the monomer is typically from 5° C. to 80° C., preferably from 10° C. to 60° C., more preferably from 15° C. to 40° C. When the temperature at the time of the polymerization is set within the range, the polymerization can be performed at a moderate reaction rate, an increase in viscosity of the reaction liquid can be suppressed, and the dispersion containing the conductive polymer can be manufactured stably and in an economical time period. In addition, the conductivity of the conductive polymer to be obtained tends to be high. The temperature at the time of the polymerization may be managed by using a known heater or cooler. In addition, the polymerization may be performed while the temperature is changed within the range as required.

[Dispersion Treatment]

In the step (A) of providing the conjugated conductive polymer-containing dispersion, the conjugated conductive polymer produced by the polymerization of the monomer is preferably subjected to a dispersion treatment during the polymerization reaction. The dispersion treatment is preferably performed with a strong stirring apparatus, such as a homogenizer, or by ultrasonic irradiation. The dispersion treatment can suppress the aggregation of the conjugated conductive polymer having a long main chain. For example, the treatment is preferably performed by a method described in JP 2007-332183 A, the method involving polymerizing the monomer while stirring the monomer at a shear rate of 5,000 $s^{-1}$ or more, and in the case of the ultrasonic irradiation, the ultrasonic irradiation is preferably performed at a power consumption of from 5 W to 500 W per 1 L of a dispersion treatment liquid until the reaction ends.

[Addition of Dispersion of Seed Particles Turned into Protective Colloid]

In addition, during the polymerization of the monomer through the use of the dispersion containing the monomer and the seed particles turned into the protective colloid, a dispersion of seed particles turned into a protective colloid by a polyanion is preferably further added. When a predetermined amount of the dispersion of the seed particles turned into the protective colloid is further added during the polymerization of the monomer, the thickening of the reaction liquid at the time of the polymerization can be suppressed, and hence an improvement in stirring and mixing efficiency of the liquid, and a reduction in load on a manufacturing apparatus can be achieved. The amount of the dispersion of the seed particles turned into the protective colloid to be added during the polymerization is preferably from 10 mass % to 90 mass %, more preferably from 20 mass % to 70 mass % of the total amount of the dispersion of the seed particles turned into the protective colloid to be used.

[Addition of Polyanion]

A polyanion may be further added during the polymerization of the monomer liquid. When a predetermined amount of part of the polyanion is further added during the polymerization of the monomer, the thickening of the reaction liquid at the time of the polymerization can be suppressed, and hence an improvement in stirring and mixing efficiency of the liquid, and a reduction in load on the manufacturing apparatus can be achieved. The amount of the polyanion to be added during the polymerization is preferably from 0 mass % to 90 mass %, more preferably from 20 mass % to 70 mass % of the total amount of the polyanion to be used.

<Step (B) of Preparing Dispersion Containing Morpholine Compound and Conjugated Conductive Polymer>

The manufacturing method of the present invention includes the step of preparing the dispersion containing the morpholine compound and the conjugated conductive polymer (hereinafter sometimes referred to as "dispersion "b""), which is obtained by adding the morpholine compound to the conjugated conductive polymer-containing dispersion (dispersion "a") obtained in the step (A) described in the foregoing.

[Morpholine Compound]

The morpholine compound is represented by the following formula (1).

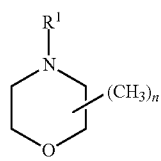 (1)

The addition of the morpholine compound enables the manufacture of a solid electrolytic capacitor that has a high capacity appearance ratio (capacitance), that is excellent in heat resistance, and that has high reliability under a high-temperature condition. In addition, the compound can impart corrosion resistance to the solid electrolytic capacitor, and can adjust the pH of the conjugated conductive polymer-containing dispersion.

In the formula (1), $R^1$ represents (1) a hydrogen atom, (2) an alkyl group having 1 to 8 carbon atoms that may be substituted with a hydroxy group, a cyano group, or an amino group, (3) a cycloalkenyl group having 5 or 6 carbon atoms, (4) a phenyl group that may be substituted with an amino group, a cyano group, or a formyl group, (5) an acetyl group, (6) an acetoacetyl group, (7) an allyl group, (8) an acryloyl group, (9) a pyridyl group, (10) an alkylsulfo group that may be substituted with a hydroxy group, or (11) a formyl group, and "n" represents 0, 1, or 2.

Specific examples of the compound represented by the formula (1) include morpholine, 4-methylmorpholine, 4-ethylmorpholine, 4-n-propylmorpholine, 4-isopropylmorpholine, 4-n-butylmorpholine, 4-isobutylmorpholine, 4-pentylmorpholine, 4-hexylmorpholine, (R)-3-methylmorpholine, (S)-3-methylmorpholine, cis-2,6-dimethylmorpholine, 4-(1-cyclohexenyl)morpholine, 1-morpholino-1-cyclopentene, 4-phenylmorpholine, 4-(p-tolyl)morpholine, 4-(2-aminoethyl)morpholine, 4-(3-aminopropyl)morpholine, 2-morpholinoaniline, 4-morpholinoaniline, 4-(2-morpholinoethoxy)aniline, 4-(4-pyridyl)morpholine, 4-aminomorpholine, 4-(2-hydroxypropyl)morpholine, 4-(2-hydroxyethyl)morpholine, 4-(3-hydroxypropyl)morpholine, 2-hydroxy-3-morpholinopropanesulfonic acid, 3-morpholinopropanesulfonic acid, 2-morpholinoethanesulfonic acid, 4-acetylmorpholine, 4-acetoacetylmorpholine, 4-acryloylmorpholine, 4-allylmorpholine, ethyl 3-(morpholino)propionate, 4-formylmorpholine, 4-(4-formylphenyl)morpholine, and salts of the compounds.

Of those, morpholine, 4-ethylmorpholine, 4-n-butylmorpholine, 4-isobutylmorpholine, 4-phenylmorpholine, 4-(2-hydroxypropyl)morpholine, 4-(2-hydroxyethyl)morpholine, and 4-(3-hydroxypropyl)morpholine are preferred from the viewpoint of productivity.

The amount of the morpholine compound to be added to the dispersion "a" is preferably from 0.1 equivalent to 4 equivalents, more preferably from 0.4 equivalent to 2 equivalents with respect to the neutralization equivalent of the dispersion "a". When the compound is added in an amount of 0.1 equivalent or more, an effect of the addition is significantly exhibited. When the compound is added in an amount of 4 equivalents or less, the dedoping of the polyanion doped into the conjugated conductive polymer hardly occurs.

In addition, the amount of the morpholine compound to be added to the dispersion "a" is preferably adjusted so that the pH of the dispersion may fall within the range of from 3 to 13, and the amount is more preferably adjusted so that the pH may fall within the range of from 4 to 7. When the pH is 3 or more, the corrosion of the solid electrolytic capacitor by a valve metal to be used, such as aluminum, hardly advances. In addition, when the pH is 13 or less, the dedoping of the polyanion doped into the conductive polymer hardly occurs.

[Other Additive]

In addition to the morpholine compound represented by the formula (1), any other additive may be added to the dispersion "b" as required. The other additive is not particularly limited as long as the additive may be mixed with the conjugated conductive polymer, and the seed particles turned into the protective colloid by the polyanion or the polyanion. In addition, the other additive may be added in the step (A).

Examples of such additive include a water-soluble polymer compound, a water-dispersible compound, an alkaline compound, a surfactant, an antifoaming agent, a coupling agent, an antioxidant, and an electrical conductivity improver. Those additives may be used alone or in combination thereof.

The water-soluble polymer compound is a water-soluble polymer having a cationic group or a nonionic group in its main chain or a side chain thereof. Specific examples of the water-soluble polymer compound include a polyoxyalkylene, a water-soluble polyurethane, a water-soluble polyester, a water-soluble polyamide, a water-soluble polyimide, a water-soluble polyacryl, a water-soluble polyacrylamide, a polyvinyl alcohol, and a polyacrylic acid. Of those, a polyoxyalkylene is preferred.

Specific examples of the polyoxyalkylene include diethylene glycol, triethylene glycol, oligopolyethylene glycol, triethylene glycol monochlorohydrin, diethylene glycol monochlorohydrin, oligoethylene glycol monochlorohydrin, triethylene glycol monobromohydrin, diethylene glycol monobromohydrin, oligoethylene glycol monobromohydrin, polyethylene glycol, glycidyl ethers, polyethylene glycol glycidyl ethers, polyethylene oxide, triethylene glycol dimethyl ether, tetraethylene glycol dimethyl ether, diethylene glycol dimethyl ether, diethylene glycol diethyl ether, diethylene glycol dibutyl ether, dipropylene glycol, tripropylene glycol, polypropylene glycol, polypropylene dioxide, a polyoxyethylene alkyl ether, a polyoxyethylene glycerin fatty acid ester, and a polyoxyethylene fatty acid amide.

The water-dispersible compound is, for example, a compound obtained by substituting part of a compound having low hydrophilicity with a functional group having high hydrophilicity, or a composite (e.g., an emulsion) obtained by the adsorption of a compound having a functional group having high hydrophilicity to the periphery of a compound having low hydrophilicity, the compound being dispersed in water without being precipitated. Specific examples thereof include a polyester, a polyurethane, an acrylic resin, a silicone resin, and emulsions of these polymers. The specific examples also include a block copolymer or graft copolymer of an acrylic resin and any other copolymer, such as a polyester or a polyurethane.

The water-soluble polymer compounds and the water-dispersible compounds may be used alone or in combination thereof. The addition of the water-soluble polymer compound and the water-dispersible compound can regulate the viscosity of the dispersion containing the conductive polymer, and can improve its application performance.

The usage amount of the water-soluble polymer compound and the water-dispersible compound is preferably from 1 part by mass to 4,000 parts by mass, more preferably from 50 parts by mass to 2,000 parts by mass with respect to 100 parts by mass of the total of the conjugated conductive polymer and the seed particles turned into the protective colloid by the polyanion. When the amount of the water-soluble polymer compound and the water-dispersible compound falls within the range of from 1 part by mass to 4,000 parts by mass, proper conductivity can be expressed, and hence a satisfactory equivalent series resistance (ESR) of the solid electrolytic capacitor is obtained.

An alkaline compound other than the morpholine compound may be added to the dispersion "b". The addition of the alkaline compound can impart corrosion resistance to an article to which the dispersion has been applied, and can adjust the pH of the conjugated conductive polymer-containing dispersion.

A known inorganic alkaline compound or a known organic alkaline compound other than the morpholine compound may be used as the alkaline compound. Examples of the inorganic alkaline compound include ammonia, sodium hydroxide, potassium hydroxide, and calcium hydroxide. Examples of the organic alkaline compound include an aromatic amine, an aliphatic amine, and an alkali metal alkoxide.

Of the aromatic amines, a nitrogen-containing heteroaryl ring compound is preferred. The nitrogen-containing heteroaryl ring compound is a nitrogen-containing heterocyclic compound showing aromaticity. In the aromatic amine, a nitrogen atom in a heterocycle has a conjugate relationship with any other atom.

Examples of the nitrogen-containing heteroaryl ring compound include pyridines, imidazoles, pyrimidines, pyrazines, and triazines. Of those, pyridines, imidazoles, and pyrimidines are preferred from the viewpoints of solvent solubility and the like.

Examples of the aliphatic amine include ethylamine, n-octylamine, diethylamine, diisobutylamine, methylethylamine, trimethylamine, triethylamine, allylamine, 2-ethylaminoethanol, 2,2'-iminodiethanol, and N-ethylethylenediamine.

Examples of the alkali metal alkoxide include: sodium alkoxides, such as sodium methoxide and sodium ethoxide; potassium alkoxides; and calcium alkoxides.

Examples of the surfactant include: anionic surfactants, such as a carboxylic acid salt, a sulfonic acid salt, a sulfuric acid ester salt, and a phosphoric acid ester salt; cationic surfactants, such as an amine salt and a quaternary ammonium salt; amphoteric surfactants, such as a carboxybetaine, an aminocarboxylic acid salt, and an imidazolium betaine; and nonionic surfactants, such as a polyoxyethylene alkyl ether, a polyoxyethylene glycerin fatty acid ester, an ethylene glycol fatty acid ester, and a polyoxyethylene fatty acid amide.

Examples of the antifoaming agent include a silicone resin, polydimethylsiloxane, and a silicone resin.

Examples of the antioxidant include a phenol-based antioxidant, an amine-based antioxidant, a phosphorus-based antioxidant, a sulfur-based antioxidant, sugars, and vitamins.

The electrical conductivity improver is not particularly limited as long as the electrical conductivity improver increases the electrical conductivity of the conjugated conductive polymer-containing dispersion. Examples of the electrical conductivity improver include: compounds each having an ether bond, such as tetrahydrofuran; compounds each having a lactone group, such as γ-butyrolactone and γ-valerolactone; amides or compounds each having a lactam group, such as caprolactam, N-methylcaprolactam, N,N-dimethylacetamide, N-methylacetamide, N,N-dimethylformamide, N-methylformamide, N-methylformanilide, N-methylpyrrolidone, N-octylpyrrolidone, and pyrrolidone; sulfone compounds or sulfoxide compounds, such as tetramethylene sulfone and dimethyl sulfoxide; sugars or sugar derivatives, such as sucrose, glucose, fructose, and lactose; sugar alcohols, such as sorbitol and mannitol; imides, such as succinimide and maleimide; furan derivatives, such as 2-furancarboxylic acid and 3-furancarboxylic acid; and dialcohols or polyalcohols, such as ethylene glycol, propylene glycol, glycerin, diethylene glycol, and triethylene glycol. Of those, tetrahydrofuran, N-methylformamide, N-methylpyrrolidone, ethylene glycol, propylene glycol, glycerin, dimethyl sulfoxide, and sorbitol are preferred, and of those, ethylene glycol, propylene glycol, and glycerin are more preferred from the viewpoint of improving the electrical conductivity. The electrical conductivity improvers may be used alone or in combination thereof.

<Step (C) of Causing Dispersion Containing Morpholine Compound and Conjugated Conductive Polymer (Dispersion "b") to Adhere to Porous Anode Body>

The method of manufacturing a solid electrolytic capacitor of the present invention includes the step (C) of causing the dispersion "b" obtained in the step (B) described in the foregoing to adhere to the surface of the porous anode body including an anode body formed of a valve metal and the dielectric film formed on at least part of the surface of the anode body.

In the solid electrolytic capacitor obtained by the manufacturing method of the present invention, for example, a porous electrode obtained by sintering valve metal powder having a large surface area, or a porous film obtained by etching valve metal foil may be used as an electrode.

Examples of the valve metal include aluminum (Al), beryllium (Be), bismuth (Bi), magnesium (Mg), germanium (Ge), hafnium (Hf), niobium (Nb), antimony (Sb), silicon (Si), tin (Sn), tantalum (Ta), titanium (Ti), vanadium (V), tungsten (W), zirconium (Zr), and an alloy or a compound of at least one of the metals and another element. An electrode material including a valve metal, such as Al, Nb, or Ta, out of those valve metals is preferred.

The porous electrode formed of the valve metal is turned into the porous anode body by, for example, forming a dielectric oxide film on its surface through anodization.

The dielectric oxide film may be formed by, for example, anodization of the porous electrode by applying a voltage to the porous electrode in a phosphoric acid solution. The magnitude of an anodization voltage may be determined by the thickness of the dielectric oxide film and the withstand voltage of the capacitor. The anodization voltage is preferably from 1 V to 800 V, more preferably from 1 V to 300 V.

Next, the dispersion "b" is caused to adhere to the porous anode body. A method of causing the dispersion to adhere to the porous anode body is, for example, a known method, such as application, spraying, or immersion. Of those, a method involving immersing the porous anode body in the dispersion "b" is preferred because the dispersion "b" can be caused to adhere to, and permeate into, the porous anode body evenly and uniformly. In addition, in order that a fine portion of the porous anode body may be impregnated with the dispersion to a larger extent, the impregnation may be performed under reduced pressure.

An immersion time is typically from about 10 seconds to about 5 minutes, and the temperature of the dispersion "b" is typically from about 10° C. to about 35° C., though the temperature varies depending on the kind of its dispersion medium.

<Step (D) of Forming Solid Electrolyte Layer>

The method of manufacturing a solid electrolytic capacitor of the present invention includes the step (D) of forming the solid electrolyte layer by removing the dispersion medium from the dispersion "b" adhered to the porous anode body, obtained in the step (C). The removal of the dispersion medium in the step (D) does not mean only the removal of the entirety of the dispersion medium, and part of the dispersion medium may remain to the extent that the manufacture of the solid electrolytic capacitor is not affected.

The dispersion medium is preferably removed by drying based on a heating treatment in terms of efficiency. Heating conditions may be determined in consideration of the boiling point and volatility of the dispersion medium. The heating is preferably performed in a temperature range in which the conductive polymer is not deteriorated by oxygen, for example, in the range of from room temperature to 300° C., preferably from 50° C. to 200° C. A heating treatment time is preferably from 5 seconds to several hours. The heating treatment may be performed with, for example, a hot plate, an oven, or a hot-air dryer under air, or may be performed under reduced pressure in order that the heating treatment may be quickly performed.

In the present invention, the step (C) of causing the dispersion to adhere to the porous anode body and the step (D) of forming the solid electrolyte layer may each be performed once, or may each be repeatedly performed twice or more in accordance with the kind of the electrode body. Every time the dispersion is caused to adhere to the porous anode body, a heating treatment may be performed to remove part or the entirety of the dispersion medium. Alternatively, the following may be performed: the dispersion is consecutively caused to adhere to the porous anode body a plurality of times, and the dispersion medium is finally removed. Further, the porous anode body may be impregnated with an arbitrary electrolytic solution after part or the entirety of the dispersion medium in the dispersion caused to adhere thereto has been removed.

EXAMPLES

The present invention is specifically described below by way of Examples and Comparative Examples. However, the present invention is not limited to these examples. Methods of measuring the respective physical properties of dispersions in Examples and Comparative Examples are as described below.

(1) Solid Content Concentration

The solid content concentration of each example was measured by using about 10 g of a sample obtained in the example and an infrared moisture meter (manufactured by Kett Electric Laboratory, model: FD-720, heating conditions: 110° C./30 minutes), and an evaporation residue was calculated as a solid content.

(2) pH

The pH of a dispersion obtained in each example was measured at 25° C. with a pH meter (manufactured by DKK-TOA Corporation, model: HM-30G).

(3) Particle Diameters of Seed Particles

The particle diameters of seed particles were measured with a Microtrac UPA-type particle size distribution-measuring apparatus manufactured by Nikkiso Co., Ltd.

(4) Weight-Average Molecular Weight of Sodium Polystyrene Sulfonate

The weight-average molecular weight of sodium polystyrene sulfonate was measured by using gel permeation chromatography. "Shodex (trademark) GPC-101" (column: OHpak SB-806M HQ) manufactured by Showa Denko K.K. was used in the measurement, and measurement conditions were as follows: a column temperature was 40° C., water was used as an eluent, and an elution rate was 1 ml/min. The weight-average molecular weight was represented as a molecular weight (Mw) in terms of standard polystyrene.

Example 1

[Manufacture of Dispersion of Seed Particles Turned Into Protective Colloid by Polyanion]

86 g of styrene, 49 g of 2-ethylhexyl acrylate, 15 g of divinylbenzene, and 500 g of a 22 mass % aqueous solution of sodium polystyrene sulfonate (manufactured by Tosoh Organic Chemical Co., Ltd., PolyNaSS PS-5, weight-average molecular weight: about 120,000) were stirred and mixed to prepare a monomer mixed liquid. Meanwhile, the temperature of 1,000 g of a 22 mass % aqueous solution of sodium polystyrene sulfonate (ditto) was increased to 80° C. while the solution was stirred, followed by the addition of 2 g of potassium persulfate thereto. The monomer mixed solution and 40 g of a 2.5 mass % aqueous solution of potassium persulfate were dropped to the resultant solution over 2 hours and 2.5 hours, respectively. After the end of the dropping, the mixture was held at 80° C. for 2 hours, and was then cooled to room temperature (25° C.) 1,500 ml of a cation exchange resin (manufactured by Organo Corporation, IR120B-H) and 1,500 ml of an anion exchange resin (manufactured by Organo Corporation, IRA410-OH) were added to the resultant reaction liquid, and the mixture was stirred for 12 hours, followed by the separation of the ion exchange resins by filtration. Ion-exchanged water (hereinafter simply referred to as "water") was added to the residue to adjust its solid content concentration to 15.0 mass %. Thus, a dispersion of seed particles turned into protective colloid by a polyanion (Tg: 30° C., d50 particle diameter: 0.46 μm) was obtained.

[Step (A): Manufacture of Conjugated Conductive Polymer-Containing Dispersion Containing Seed Particles Turned Into Protective Colloid by Polyanion (Dispersion "a")]

In a 1-liter polyethylene-made vessel, 223.2 g of water, 31.5 g of a 12 mass % aqueous solution of sodium polystyrene sulfonate, and 34.0 g of the dispersion of the seed particles turned into the protective colloid by the polyanion, the dispersion having been manufactured in the foregoing, were stirred and mixed at 32° C. 2.80 g of 3,4-ethylenedioxythiophene was added to the mixed liquid at 32° C., and the contents were emulsified and mixed with a homomixer (manufactured by Tokushu Kika Kogyo Co., Ltd., ROBO-MIX; 4,000 rpm) for 30 minutes to prepare a monomer dispersion (sulfo group content with respect to 1 mol of 3,4-ethylenedioxythiophene: 1.9 mol). The sulfo group is derived from the sodium polystyrene sulfonate in the 12 mass % aqueous solution of the sodium polystyrene sulfonate and that in the dispersion.

The monomer dispersion was loaded into a 1-liter stainless steel-made vessel having connected thereto a high-shear mixer (manufactured by Pacific Machinery & Engineering Co., Ltd., MILDER (trademark) 303V; 5,000 rpm) and a circulation pump. The dispersion was stirred with a stirring blade and the high-shear mixer while being circulated at 32° C., and 5.89 g of sodium peroxodisulfate and 6.88 g of a 1 mass % aqueous solution of iron(III) sulfate hexahydrate were added as oxidants to the dispersion to perform a polymerization reaction for 24 hours. 221 g of the resultant reaction liquid and 79 g of water were loaded into a 1-liter stainless steel-made vessel having connected thereto a high-shear mixer (manufactured by IKA, MAGIC LAB; 1,800 rpm) and a circulation pump, and a dispersion treatment was performed for 12 hours by stirring the mixture while circulating the mixture. 300 ml of a cation exchange resin (ditto) and 300 mL of an anion exchange resin (ditto) were added to 300 g of the resultant dispersion, and the mixture was stirred for 6 hours. After that, the ion exchange resins were separated by filtration, and an unreacted monomer and the oxidants were removed by the operation. Thus, a dispersion containing a composite of the seed particles turned into the protective colloid by the polyanion and a conjugated conductive polymer (solid content concentration: 2.7 mass %, pH: 1.9) was obtained.

[Step (B): Preparation of Dispersion Containing Morpholine Compound and Conjugated Conductive Polymer (Dispersion "b")]

Morpholine was added to the resultant dispersion, and pure water was further added thereto. Thus, a dispersion having a solid content concentration of 1.6 mass % and a pH of 4.9 was obtained. Further, 5 parts by mass of ethylene glycol was added to 100 parts by mass of the resultant dispersion. Thus, an impregnation liquid (1-1) for manufacturing a solid electrolytic capacitor was obtained.

[Formation of Porous Anode Body Having Dielectric Oxide Film on its Surface]

A porous anode body having a dielectric oxide film on its surface, which was used in a solid electrolytic capacitor, was manufactured by a method described in JP 2011-77257 A. That is, such a porous anode body with an anode lead that a dielectric oxide film including diniobium pentoxide was formed on the surface of the anode body was manufactured by using niobium powder for a capacitor. The porous anode body had a capacitance of 21.4 µF in 20% sulfuric acid.

[Steps (C) and (D): Manufacture of Solid Electrolytic Capacitor]

Under air at 25° C., the porous anode body obtained by the above-mentioned method was impregnated with the impregnation liquid (1-1) for 1 minute, followed by drying with a hot-air dryer (manufactured by Tabai, model: ST-110) at 120° C. for 30 minutes; the treatment was repeatedly performed 10 times. Next, a carbon paste was applied to the porous anode body so as to be out of contact with its anode lead terminal, and was dried. Further, a silver paste was applied on the carbon paste and the resultant was placed on a lead frame and dried for forming a contact point between a cathode and the lead frame. The resultant element was sealed with a resin while the anode lead wire of the element was electrically connected to the anode lead portion of the lead frame. Thus, a solid electrolytic capacitor element was obtained. The capacitance (µF) of the resultant solid electrolytic capacitor element at 120 Hz was measured with an LCR meter, and was adopted as its initial capacitance. Next, the capacitance (µF) of the element at 120 Hz after its standing in a hot-air dryer at 130° C. for 250 hours was measured. The results are shown in Table 1.

Example 2

A dispersion having a solid content concentration of 1.7 mass % and a pH of 4.5 was obtained by adding 4-ethylmorpholine instead of morpholine in Example 1. Further, 5 parts by mass of ethylene glycol was added to 100 parts by mass of the resultant dispersion. Thus, an impregnation liquid (1-2) for manufacturing a solid electrolytic capacitor was obtained. A solid electrolytic capacitor element was manufactured by the same method as that of Example 1, and its capacitance (µF) at 120 Hz was measured with an LCR meter. Further, the capacitance (µF) of the resultant element at 120 Hz after its standing in a hot-air dryer at 130° C. for 250 hours was measured. The results are shown in Table 1.

Example 3

A dispersion having a solid content concentration of 1.7 mass % and a pH of 4.7 was obtained by adding 4-(2-hydroxyethyl)morpholine instead of morpholine in Example 1. Further, 5 parts by mass of ethylene glycol was added to 100 parts by mass of the resultant dispersion. Thus, an impregnation liquid (1-3) for manufacturing a solid electrolytic capacitor was obtained. A solid electrolytic capacitor element was manufactured by the same method as that of Example 1, and its capacitance (µF) at 120 Hz was measured with an LCR meter. Further, the capacitance (µF) of the resultant element at 120 Hz after its standing in a hot-air dryer at 130° C. for 250 hours was measured. The results are shown in Table 1.

Example 4

[Step (A): Manufacture of Conjugated Conductive Polymer-Containing Dispersion Containing Polyanion (Dispersion "a") (Free of Seed Particles)]

In a 1-liter polyethylene-made vessel, 231.0 g of water and 60.0 g of a 12 mass % aqueous solution of sodium polystyrene sulfonate were stirred and mixed at 32° C. 2.80 g of 3,4-ethylenedioxythiophene was added to the mixed liquid at 32° C., and the contents were emulsified and mixed with a homomixer (manufactured by Tokushu Kika Kogyo Co., Ltd., ROBOMIX; 4,000 rpm) for 30 minutes to prepare a monomer dispersion.

The monomer dispersion was loaded into a 1-liter stainless steel-made vessel having connected thereto a high-shear mixer (manufactured by Pacific Machinery & Engineering Co., Ltd., MILDER (trademark) 303V; 5,000 rpm) and a circulation pump. The dispersion was stirred with a stirring blade and the high-shear mixer while being circulated at 32° C., and 5.89 g of sodium peroxodisulfate and 6.88 g of a 1 mass % aqueous solution of iron(III) sulfate hexahydrate were added as oxidants to the dispersion to perform a polymerization reaction for 24 hours. 221 g of the resultant reaction liquid and 79 g of water were loaded into a 1-liter stainless steel-made vessel having connected thereto a high-shear mixer (manufactured by IKA, MAGIC LAB; 1,800 rpm) and a circulation pump, and a dispersion treatment was performed for 12 hours by stirring the mixture while circulating the mixture. 300 ml of a cation exchange resin (ditto) and 300 mL of an anion exchange resin (ditto) were added to 300 g of the resultant dispersion, and the mixture was stirred for 6 hours. After that, the ion exchange resins were separated by filtration, and an unreacted monomer and the oxidants were removed by the operation. Thus, a dispersion containing a composite of a polyanion and a conjugated conductive polymer (solid content concentration: 2.6 mass %, pH: 1.8) was obtained.

[Step (B): Preparation of Dispersion Containing Morpholine Compound and Conjugated Conductive Polymer (Dispersion "b") (Free of Seed Particles)]

A dispersion having a solid content concentration of 1.6 mass % and a pH of 4.6 was obtained by adding morpholine to the resultant dispersion. Further, 5 parts by mass of ethylene glycol was added to 100 parts by mass of the resultant dispersion. Thus, an impregnation liquid (1-4) for manufacturing a solid electrolytic capacitor was obtained. A solid electrolytic capacitor element was manufactured by the same method as that of Example 1, and its capacitance (μF) at 120 Hz was measured with an LCR meter. Further, the capacitance (μF) of the resultant element at 120 Hz after its standing in a hot-air dryer at 130° C. for 250 hours was measured. The results are shown in Table 1.

Comparative Example 1

A dispersion having a solid content concentration of 1.4 mass % and a pH of 1.9 was obtained without the performance of the addition of morpholine in Example 1. 5 Parts by mass of ethylene glycol was added to 100 parts by mass of the dispersion. Thus, an impregnation liquid (1-5) for manufacturing a solid electrolytic capacitor was obtained. A solid electrolytic capacitor element was manufactured by the same method as that of Example 1, and its capacitance (μF) at 120 Hz was measured with an LCR meter. Further, the capacitance (μF) of the resultant element at 120 Hz after its standing in a hot-air dryer at 130° C. for 250 hours was measured. The results are shown in Table 1.

Comparative Example 2

A dispersion having a solid content concentration of 1.5 mass % and a pH of 4.8 was obtained by adding ammonia water instead of morpholine in Example 1. Further, 5 parts by mass of ethylene glycol was added to 100 parts by mass of the resultant dispersion. Thus, an impregnation liquid (1-6) for manufacturing a solid electrolytic capacitor was obtained.

A solid electrolytic capacitor element was manufactured by the same method as that of Example 1, and its capacitance (μF) at 120 Hz was measured with an LCR meter. Further, the capacitance (μF) of the resultant element at 120 Hz after its standing in a hot-air dryer at 130° C. for 250 hours was measured. The results are shown in Table 1.

TABLE 1

|  | Initial capacitance (μF) | Capacitance after 250 hours at 130° C. (μF) |
| --- | --- | --- |
| Example 1 | 20.1 | 19.8 |
| Example 2 | 20.5 | 20.2 |
| Example 3 | 19.8 | 19.0 |
| Example 4 | 19.5 | 19.2 |
| Comparative Example 1 | 20.8 | 15.6 |
| Comparative Example 2 | 19.9 | 16.4 |

It is found from the results of Table 1 that the solid electrolytic capacitor elements of Examples 1 to 4 in each of which the dispersion containing the conjugated conductive polymer having added thereto the morpholine compound was used in the step of causing the dispersion to adhere to the porous anode body formed of the valve metal having the dielectric film each have a more stable capacity appearance ratio (capacitance), more excellent heat resistance, and higher reliability under a high-temperature condition than those of each of the solid electrolytic capacitor elements of Comparative Examples 1 and 2 in each of which no morpholine compound was added.

INDUSTRIAL APPLICABILITY

According to the present invention, the solid electrolytic capacitor that has a high capacity appearance ratio (capacitance), that is excellent in heat resistance, and that has high reliability under a high-temperature condition, which is industrially useful, can be manufactured.

The invention claimed is:

1. A method of manufacturing a solid electrolytic capacitor, including:
   a step (A) of providing a conjugated conductive polymer-containing dispersion by polymerizing, in a dispersion medium containing seed particles turned into protective colloid by a polyanion or in a dispersion medium containing the polyanion, a monomer for obtaining a conjugated conductive polymer;
   a step (B) of preparing a dispersion containing a morpholine compound represented by the following formula (1) and the conjugated conductive polymer by adding the morpholine compound to the conjugated conductive polymer-containing dispersion:

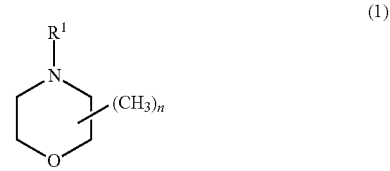

where $R^1$ represents (1) a hydrogen atom, (2) an alkyl group having 1 to 8 carbon atoms that may be substituted with a hydroxy group, a cyano group, or an amino group, (3) a cycloalkenyl group having 5 or 6 carbon atoms, (4) a phenyl group that may be substituted with an amino group, a cyano group, or a formyl group, (5) an acetyl group, (6) an acetoacetyl group, (7) an allyl group, (8) an acryloyl group, (9) a pyridyl group, (10) an alkylsulfo group that may be substituted with a hydroxy group, or (11) a formyl group, and "n" represents 0, 1, or 2;

a step (C) of causing the dispersion to adhere to a porous anode body formed of a valve metal having a dielectric film on a surface thereof; and
   a step (D) of forming a solid electrolyte layer by removing the dispersion medium from the dispersion containing the morpholine compound and the conjugated conductive polymer, the dispersion adhering to the porous anode body.

2. The method of manufacturing a solid electrolytic capacitor according to claim 1, wherein the morpholine compound represented by the formula (1) is morpholine, 4-ethylmorpholine, 4-n-butylmorpholine, 4-isobutylmorpholine, 4-phenylmorpholine, 4-(2-hydroxypropyl)morpholine, 4-(2-hydroxyethyl)morpholine, or 4-(3-hydroxypropyl)morpholine.

3. The method of manufacturing a solid electrolytic capacitor according to claim 1, wherein the seed particles are particles of a polymer of an ethylenically unsaturated monomer.

4. The method of manufacturing a solid electrolytic capacitor according to claim 1, wherein the seed particles turned into the protective colloid by the polyanion have a d50 particle diameter of from 0.01 μm to 10 μm.

5. The method of manufacturing a solid electrolytic capacitor according to claim 1, wherein the step (A) of providing the conjugated conductive polymer-containing dispersion includes further adding a polyanion or a dispersion of seed particles turned into a protective colloid by a polyanion during the polymerization of the monomer for obtaining the conjugated conductive polymer.

6. The method of manufacturing a solid electrolytic capacitor according to claim 1, wherein the step (A) of providing the conjugated conductive polymer-containing dispersion includes subjecting the conjugated conductive polymer to be produced to a dispersion treatment.

7. The method of manufacturing a solid electrolytic capacitor according to claim 6, wherein the dispersion treatment is ultrasonic irradiation.

8. The method of manufacturing a solid electrolytic capacitor according to claim 1, wherein the monomer for obtaining the conjugated conductive polymer includes at least one selected from a pyrrole compound, an aniline compound, and a thiophene compound each of which may have a substituent.

9. The method of manufacturing a solid electrolytic capacitor according to claim 1, wherein the monomer for obtaining the conjugated conductive polymer is a compound represented by the following formula (2):

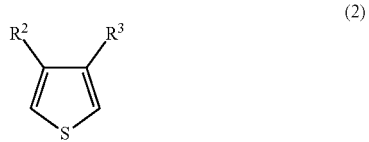

(2)

where $R^2$ and $R^3$ each independently represent a hydrogen atom, a hydroxy group, an alkyl group having 1 to 18 carbon atoms that may have a substituent, an alkoxy group having 1 to 18 carbon atoms that may have a substituent, or an alkylthio group having 1 to 18 carbon atoms that may have a substituent, or $R^2$ and $R^3$ are bonded to each other to represent an alicycle having 3 to 10 carbon atoms that may have a substituent, an aromatic ring having 6 to 10 carbon atoms that may have a substituent, an oxygen atom-containing heterocycle having 2 to 10 carbon atoms that may have a substituent, a sulfur atom-containing heterocycle having 2 to 10 carbon atoms that may have a substituent, or a sulfur atom and oxygen atom-containing heterocycle having 2 to 10 carbon atoms that may have a substituent.

10. The method of manufacturing a solid electrolytic capacitor according to claim 1, wherein the polyanion is a polymer having a sulfo group.

11. The method of manufacturing a solid electrolytic capacitor according to claim 1, wherein a ratio of anion groups in the polyanion is from 0.25 mol to 30 mol with respect to 1 mol of the monomer for obtaining the conjugated conductive polymer.

12. The method of manufacturing a solid electrolytic capacitor according to claim 1, wherein in the step (A) of providing the conjugated conductive polymer-containing dispersion, the dispersion medium contains water, and the polymerization is performed by using at least one oxidant selected from peroxodisulfuric acid and a salt thereof.

13. The method of manufacturing a solid electrolytic capacitor according to claim 1, wherein the step (B) includes adding at least one selected from ethylene glycol, propylene glycol, and glycerin as an electrical conductivity improver.

14. The method of manufacturing a solid electrolytic capacitor according to claim 1, wherein the step (A) is a step of providing the conjugated conductive polymer-containing dispersion by polymerizing a monomer for obtaining the conjugated conductive polymer in a dispersion medium containing seed particles turned into a protective colloid by a polyanion.

* * * * *